United States Patent
Sung et al.

(10) Patent No.: US 12,463,846 B2
(45) Date of Patent: Nov. 4, 2025

(54) METHODS AND SYSTEMS FOR TRANSMITTING SESSION-BASED PACKETS

(71) Applicant: Pismo Labs Technology Limited, Kowloon (HK)

(72) Inventors: Patrick Ho Wai Sung, Kowloon (HK); Wan Chun Leung, New Territories (HK); Kam Chiu Ng, New Territories (HK); Chun Kit Chan, New Territories (HK)

(73) Assignee: Pismo Labs Technology Limited, Kowloon (HK)

( * ) Notice: Subject to any disclaimer, the term of this patent is extended or adjusted under 35 U.S.C. 154(b) by 698 days.

(21) Appl. No.: 17/781,604

(22) PCT Filed: Aug. 28, 2020

(86) PCT No.: PCT/IB2020/058035
§ 371 (c)(1),
(2) Date: Jun. 1, 2022

(87) PCT Pub. No.: WO2022/043737
PCT Pub. Date: Mar. 3, 2022

(65) Prior Publication Data
US 2023/0011715 A1  Jan. 12, 2023

(51) Int. Cl.
*H04W 8/12* (2009.01)
*H04L 9/40* (2022.01)
(Continued)

(52) U.S. Cl.
CPC ...... *H04L 12/4633* (2013.01); *H04L 63/0272* (2013.01); *H04L 63/029* (2013.01); *H04L 67/143* (2013.01); *H04L 2212/00* (2013.01)

(58) Field of Classification Search
CPC .... H04W 76/12; H04W 8/12; H04L 12/4633; H04L 63/0272; H04L 63/029; H04L 67/143; H04L 2212/00; H04L 67/14
See application file for complete search history.

(56) References Cited

U.S. PATENT DOCUMENTS

2003/0093563 A1* 5/2003 Young ............... H04L 12/4633
                                                       709/230
2013/0094423 A1* 4/2013 Wengrovitz ....... H04L 12/1836
                                                       370/312
(Continued)

FOREIGN PATENT DOCUMENTS

CN   101959177 A   1/2011
CN   103685007 A   3/2014
(Continued)

OTHER PUBLICATIONS

International Search Report in International Application No. PCT/IB2020/058035, mailed on May 26, 2021.
(Continued)

*Primary Examiner* — Lan-Huong Truong
(74) *Attorney, Agent, or Firm* — Stein IP, LLC

(57) ABSTRACT

The present invention discloses methods and systems for sending and receiving IP packets between network nodes through a tunnel. The tunnel is created according to a session. When the IP packet is a first of the IP packets in sequence of a session, establish a tunnel and send the IP packet through the tunnel of the session. When the IP packet is not the first of the IP packets in sequence of a session, sending the IP packet through the tunnel of the session.

20 Claims, 13 Drawing Sheets

(51) Int. Cl.
*H04L 12/46* (2006.01)
*H04L 67/143* (2022.01)

(56) References Cited

U.S. PATENT DOCUMENTS

2016/0254974 A1* 9/2016 Dunn .................... H04L 67/565
370/252
2017/0223063 A1 8/2017 Herrero

FOREIGN PATENT DOCUMENTS

CN 104348821 A 2/2015
CN 109600293 A * 4/2019 ......... H04L 12/4633

OTHER PUBLICATIONS

Written Opinion of the International Search Authority in International Application No. PCT/IB2020/058035, mailed on May 26, 2021.
English Language Abstract along with original specification of CN109600293A.
English Language Abstract along with original specification of CN101959177A.
English Language Abstract along with original specification of CN103685007A.
English Language Abstract along with original specification of CN104348821A.

* cited by examiner

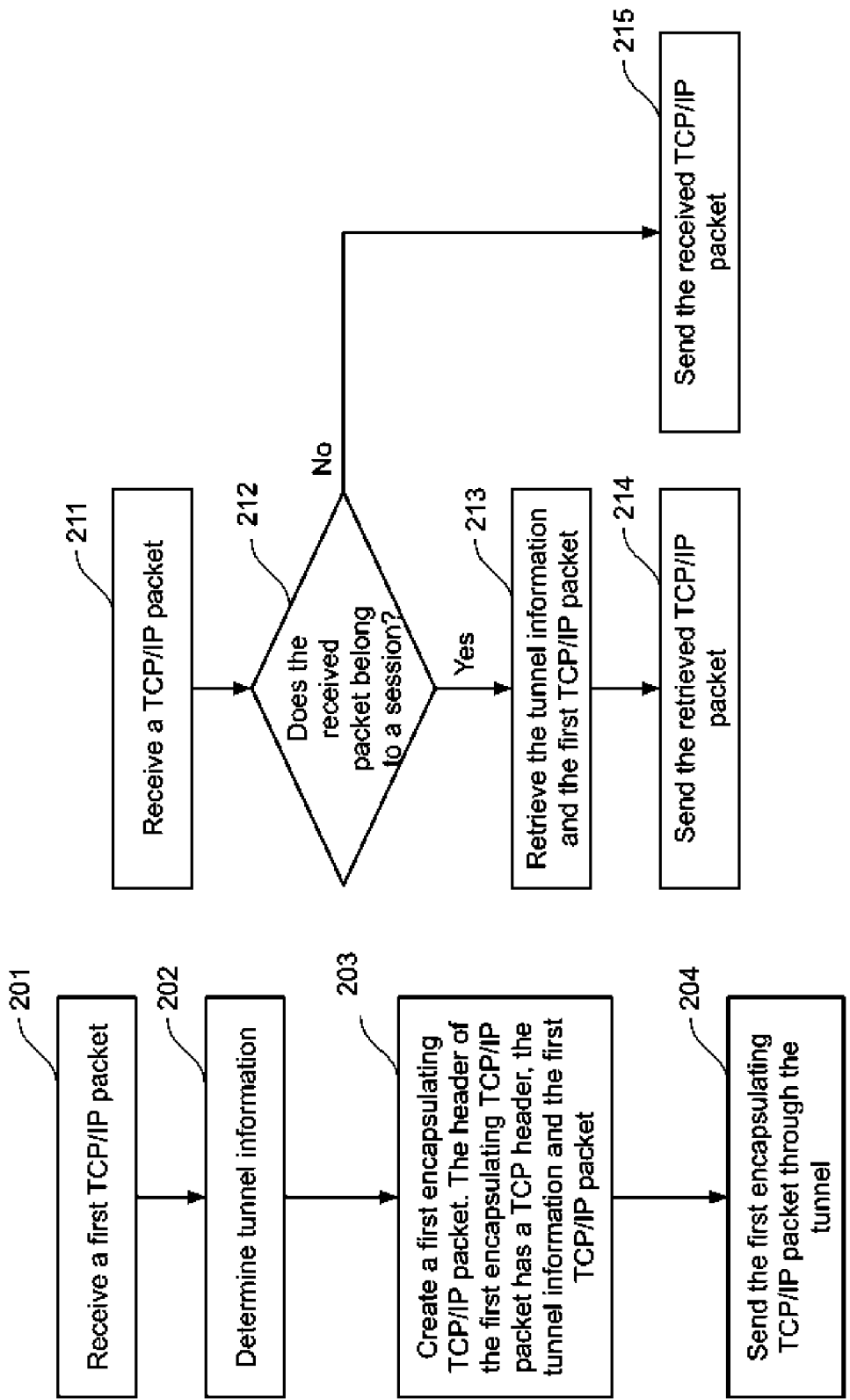

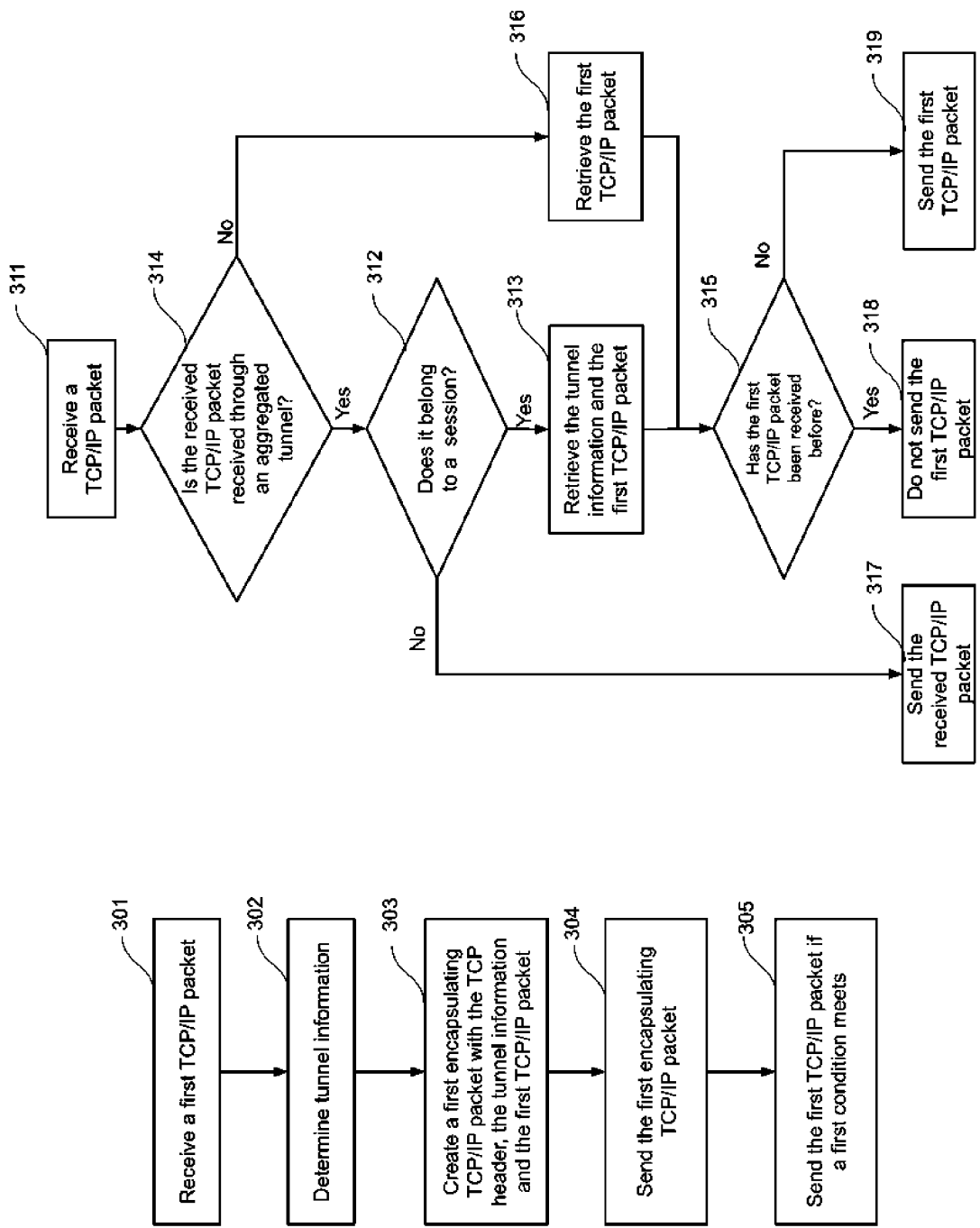

METHODS AND SYSTEMS FOR TRANSMITTING SESSION-BASED PACKETS

RELATED APPLICATIONS

This patent application is a 371 National Stage entry of Patent Cooperation Treaty application No. PCT/IB2020/058035, filed on Aug. 28, 2020, the contents of which are hereby incorporated by reference in their entirety.

TECHNICAL FIELD

The present invention relates in general to the field of computer networks, more particularly, the present invention relates to methods and systems for sending and receiving IP packets between network nodes through tunnels.

BACKGROUND ART

When a source host sends TCP/IP packets to a destination host through a tunnel, all the TCP/IP packets, regardless of sessions, are sent through the same tunnel. The encapsulating packets, which encapsulate the TCP/IP packets, will have the same source address, same destination address, same source port number and same destination port number. From the perspective of a router-in-the-middle, all the encapsulating packets belong to the same session. If the router in the middle applies network optimization, shaping, prioritization or any other methods per session, all TCP/IP packets encapsulated in the tunnel may be affected non-discriminatorily.

On the other hand, some of the routers in-the-middle may be able to apply network optimization, shaping, prioritization, to improve or downgrade the sending of TCP/IP packets based on the type and/or session of the TCP/IP packets.

Therefore, it may not be desirable for all TCP/IP packets being sent and received through the router in the middle using the same source address, same destination address, same source port number and same destination port number.

FIG. 1A illustrates a typical network scenario. Network device 102 has two access networks, illustrated by the two lines, as wide area networks (WANs) to connect to public/private interconnected networks 107. Network device 102 is also connected to mobile device 101 and laptop 105 through a LAN, such as Ethernet and Wi-Fi, illustrated by the lines from mobile device 101 to network device 102 and from laptop 105 to network device 102. Network device 103 has three access networks, illustrated by the three lines, as WANs to connect to public/private interconnected networks 107. Network device 103 is also connected to mobile device 106 and desktop 104 through a LAN, such as Ethernet and Wi-Fi, illustrated by the lines from mobile device 106 to network device 103 and from desktop 104 to network device 103.

Referring to the network diagram shown in FIG. 1A, the data packets are sent from a source device to a destination device through public/private interconnected networks 107. The source device and the destination device, such as mobile device 101, laptop 105, desktop 104, and mobile device 106, may be connected to the network device 102 and network device 103. There is no limitation on the type of the source device and the destination device. For example, the source device and the destination device may be a workstations, a desktop computers, a laptops, a servers, a handheld computers, mobile devices, media playing devices, a gaming systems, or any other type and form of computing, telecommunications or media device that is capable of communication and that have sufficient processor power and memory capacity to perform the operations described herein.

FIG. 1B illustrates a typical virtual private network (VPN) deployment of the typical network scenario illustrated in FIG. 1A. It should be noted that the lines illustrated in FIG. 1B represents logical data connections, not access networks in FIG. 1A. For illustrative purposes, mobile device 101 has one logical data connection with desktop 104 and two logical data connections with mobile device 106; laptop 105 has two logical data connections with desktop 104 and one logical data connection with mobile device 106. Therefore, mobile device 101 has the three logical data connections, illustrated by the three lines between mobile device 101 and network device 102, passing through network device 102. Laptop 105 has the three logical data connections, illustrated by the three lines between laptop 105 and network device 102, passing through network device 102. Similarly, mobile device 106 has the three logical data connections, illustrated by the three lines between mobile device 106 and network device 103, passing through network device 103. Desktop 104 has the three logical data connections, illustrated by the three lines between desktop 104 and network device 103, passing through network device 103.

Network devices 102 and 103 are connected through tunnel 108, which is established through public/private interconnect networks 107. The six logical data connections are carried by tunnel 108. Therefore, if one or more in-the-middle routers in public/private interconnected networks 107 applies network optimization, shaping, prioritization based on session or any other methods that may affect the network characteristics or performance on tunnel 108, all packets of the six logical data connections may be affected non-discriminatorily.

FIG. 1C illustrates another variant of typical network deployment of the network scenario illustrated in FIG. 1A. Compared to FIG. 1B, there is no tunnel between network devices 102 and 103. Therefore, the six logical data connections are passing through network device 102, public/private interconnected networks 107 and network device 103. As there is no tunnel, the six logical data connections may not be encrypted using the desired encryption protocol, and devices of a LAN may not be able to communicate with devices in another LAN as they are all in the same LAN.

FIG. 1E illustrates another typical network deployment of the typical network scenario illustrated in FIG. 1A. No tunnel or logical data connection is established between the network devices 102 and 103.

Therefore, there are disadvantages when using one tunnel only or no tunnel.

SUMMARY OF INVENTION

The present invention discloses a method for sending and receiving IP packets between a first network node and a second network node. The method comprises: identifying source address, destination address, source port number and destination port number of a first IP packet. When the identified destination address of the first packet is reachable through the second network node and the first IP packet is a first of the IP packets in sequence of a session, establish a tunnel between the first network node and the second network node, and send the first IP packet through the tunnel afterwards. When the first IP packet is not the first of the IP packets in sequence of a session, send the first IP packet through a corresponding tunnel of the session. When the session ends, remove the corresponding tunnel of the session.

BRIEF DESCRIPTION OF DRAWINGS

FIG. 2A is the flowchart illustrating the processes performing in a network device when sending a TCP/IP packet through a tunnel according to embodiments of the present invention.

FIG. 2B is the flowchart illustrating the processes performing in a network device when receiving a TCP/IP packet through a VPN tunnel according to embodiments of the present invention.

FIG. 3A is the flowchart illustrating the processes performing in a network device when sending a TCP/IP packet through a tunnel according to embodiments of the present invention.

FIG. 3B is the flowchart illustrating the processes performing in a network device when receiving a TCP/IP packet through a tunnel according to embodiments of the present invention.

DESCRIPTION OF EMBODIMENTS

Figure 1A:
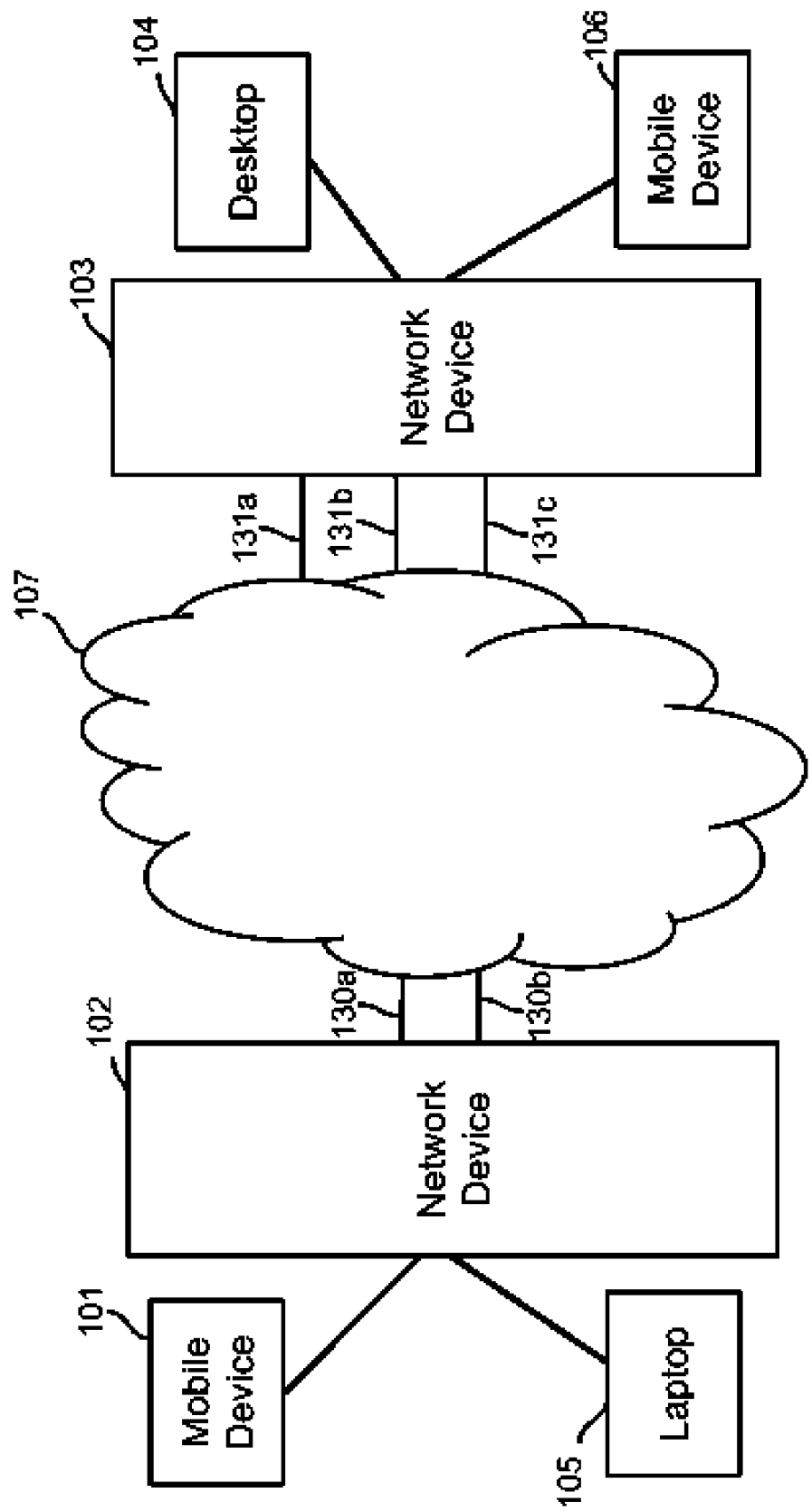
FIG. 1A illustrates a network diagram with physical connection according to embodiments of the present invention.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It is being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Embodiments, or portions thereof, may be embodied in program instructions operable upon a processing unit for performing functions and operations as described herein. The program instructions making up the various embodiments may be stored in a storage medium.

The program instructions making up the various embodiments may be stored in a storage medium. Moreover, as disclosed herein, the term storage medium may represent one or more devices for storing data, including read-only memory (ROM), programmable read-only memory (PROM), erasable programmable read-only memory (EPROM), random access memory (RAM), magnetic RAM, core memory, floppy disk, flexible disk, hard disk, magnetic tape, CD-ROM, flash memory devices, a memory card and/or other machine-readable mediums for storing information.

A processing unit may be a microprocessor, a microcontroller, a digital signal processor (DSP), any combination of those devices, or any other circuitry configured to process information.

A processing unit executes program instructions or code segments for implementing embodiments of the present invention. Furthermore, embodiments may be implemented by hardware, software, firmware, middleware, microcode, hardware description languages, or any combination thereof. When implemented in software, firmware, middleware or microcode, the program instructions to perform the necessary tasks may be stored in a computer readable storage medium. A processing unit(s) may be realized by virtualization, and may be a virtual processing unit(s) including a virtual processing unit in a cloud-based instance.

A network device may be a host or a node. A host may be a personal computer, workstations, mainframes, file servers, thin client, PDA, smart phone, or other computer device. A node may be a modem, a hub, a bridge, a router, an access point, a gateway, a virtual machine, or a server. A node acts as a connection point, a redistribution point or a communication endpoint. A node is capable of sending, receiving, or forwarding data packets. A network device may be realized by virtualization, and may be a virtual network device.

An IP packet may be encapsulated in an encapsulating IP packet. An IP packet may also be an encapsulating IP packet if it encapsulates another IP packet. An IP packet and an encapsulating packet that encapsulates the IP packet may be of the same protocol or different protocols.

An access network connected to a network interface may be in the form of WAN connection.

A WAN connection may be in the form of optical fiber, cable, Ethernet, ATM, Frame Relay, T1/E1, IPv4, IPv6, wireless technologies, Wi-Fi, WiMax, High-Speed Packet Access technology, DSL, MPLS, satellite connections, cellular network, such as 3G, 4G, 5G and 3GPP Long Term Evolution (LTE) or the like.

An end-to-end connection may be implemented using a connection-oriented protocol, such as Transmission Control Protocol (TCP), or connectionless protocol, such as User Datagram Protocol (UDP), to transmit data packets. Well-known protocols for deploying end-to-end connections include Layer 2 Tunnelling Protocol (L2TP), secure shell (SSH) protocol, Multi-protocol Label Switching (MPLS), and Microsoft's Point-to-Point Tunnelling Protocol (PPTP).

A network interface may be a virtual network interface, including a virtual network interface in a cloud-based instance.

A plurality of tunnels may be Virtual Private Network (VPN) tunnels. A plurality of Virtual Private Network (VPN) tunnels are aggregated or bonded together to form one aggregated VPN connection. Those skilled in the arts would appreciate that there are myriad ways to aggregate or bond a plurality of VPN tunnels to form one aggregated VPN connection. An aggregated VPN connection could be perceived as one VPN connection by sessions or applications that are using it. One example of an aggregated VPN connection is SpeedFusion developed by Peplink.

Figure 4:
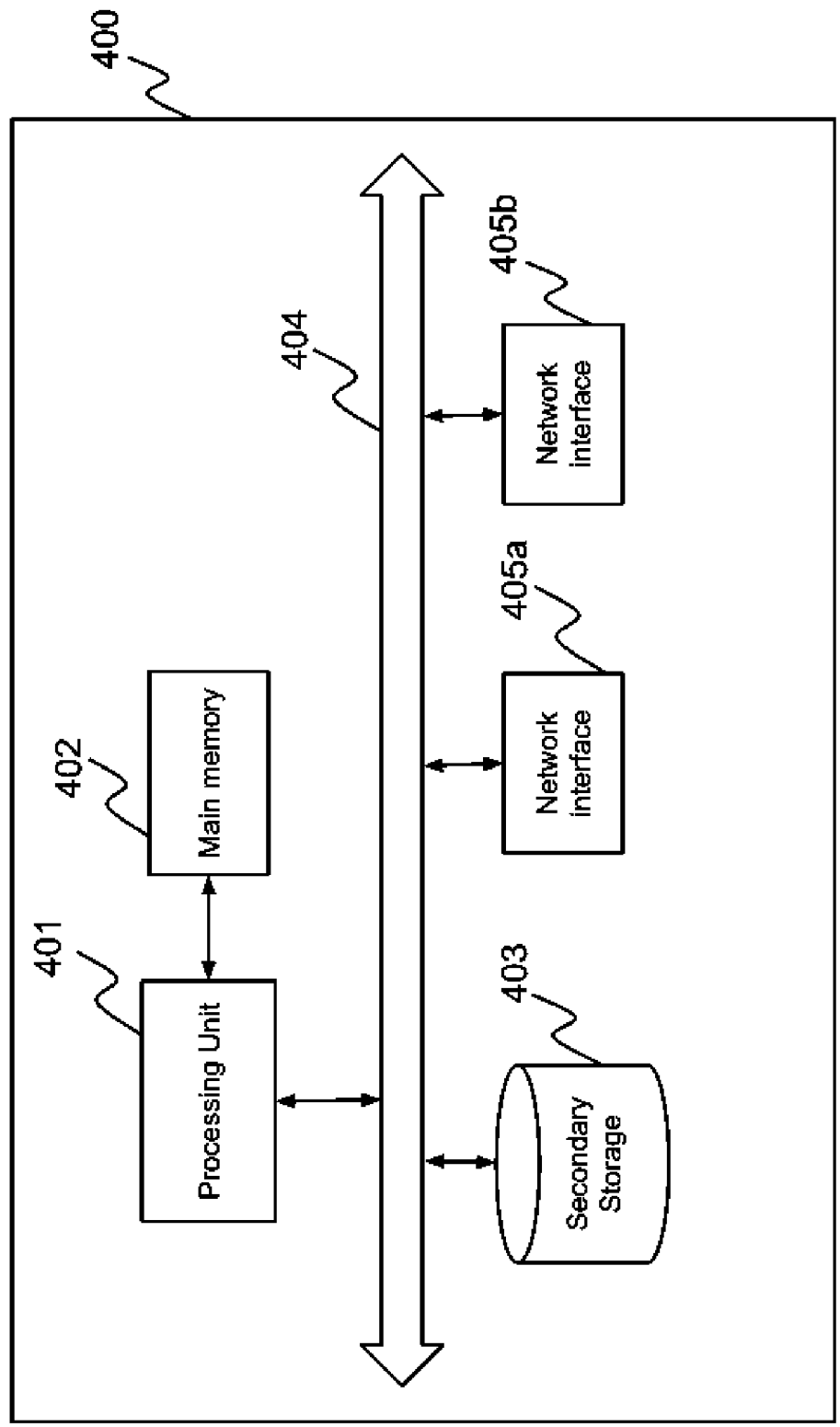
FIG. 4 is a block diagram of one example of an illustrative network device in accordance with the herein described systems and methods according to embodiments of the present invention.

FIG. 4 is an illustrative block diagram of network device 400 according to one of the embodiments of the present invention. Network device 400 comprises processing unit 401, main memory 402, secondary storage 403, and network interfaces 405a and 405b. Processing unit 401 is connected to main memory 402. Processing unit 401 is connected to secondary storage 403 and network interfaces 405a and 405b via bus 404. Processing unit 401 controls all operations of network device 400.

Network device 400 as shown in FIG. 4 may be a router. Network device 400 may be implemented by software or hardware. If network device 400 is implemented by hardware, network device 400 may have a chassis box. Network interfaces 405a and 405b, processing unit 401 and secondary storage 403 are soldered on a circuit board inside the chassis box.

Network device 400 may be an exemplary embodiment of network device 102 or 103 shown in FIG. 1A, FIG. 1D, FIG. 1E and FIG. 8.

Figure 1B:
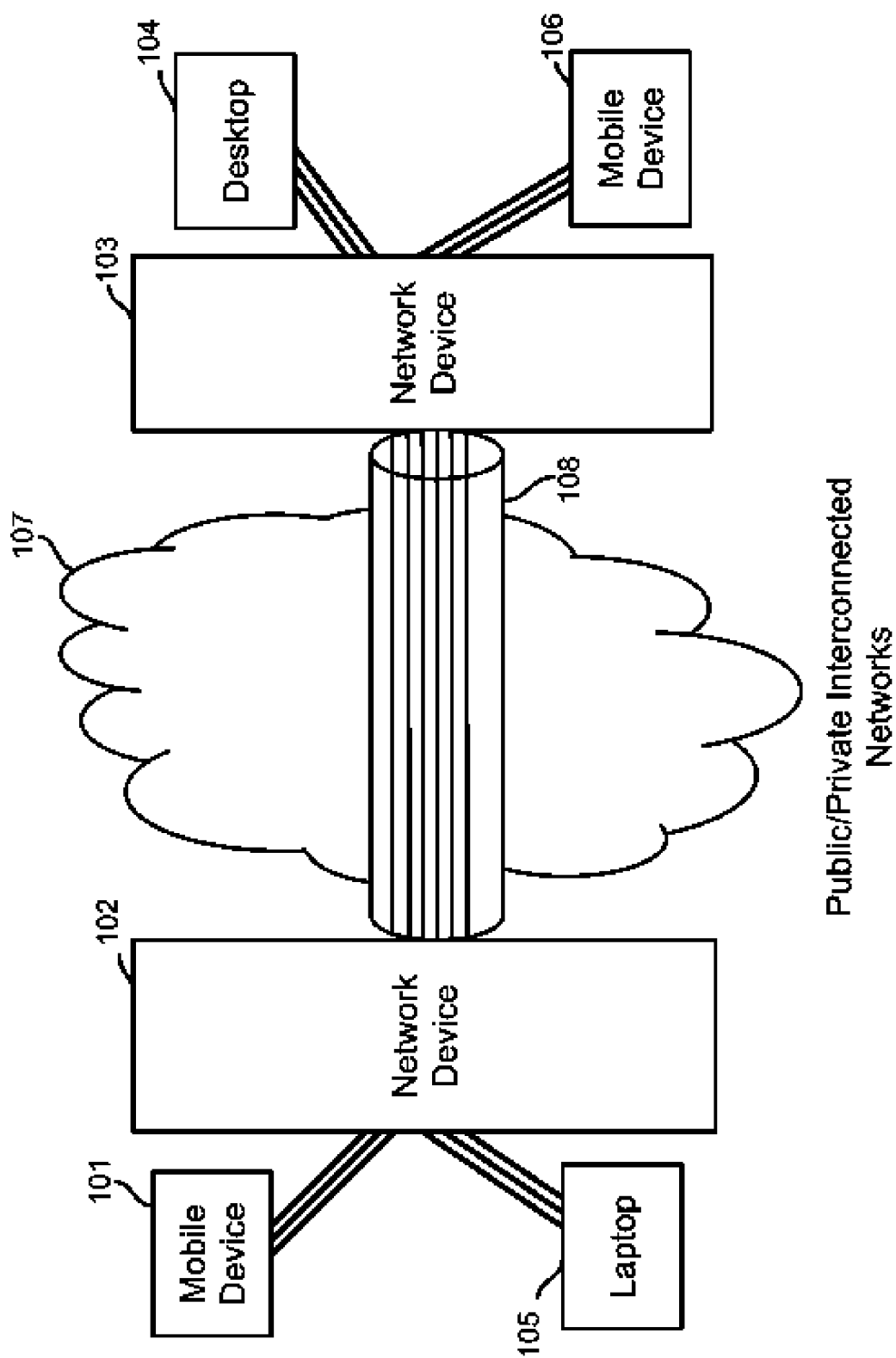
FIG. 1B illustrates a network diagram with a tunnel according to embodiments of the prior art.
Figure 1C:
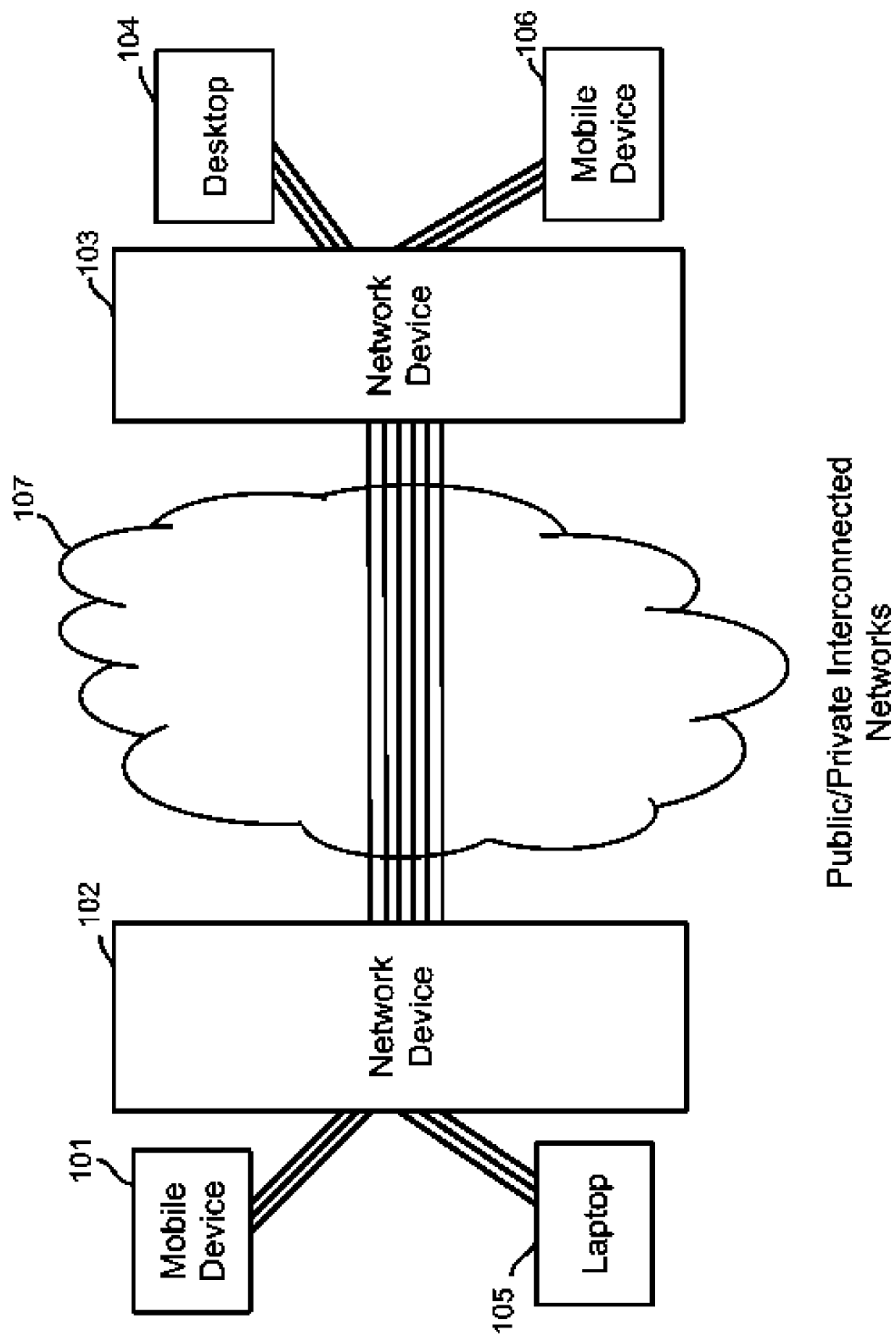
FIG. 1C illustrates a network diagram without a tunnel according to embodiments of the prior art.
Figure 1D:
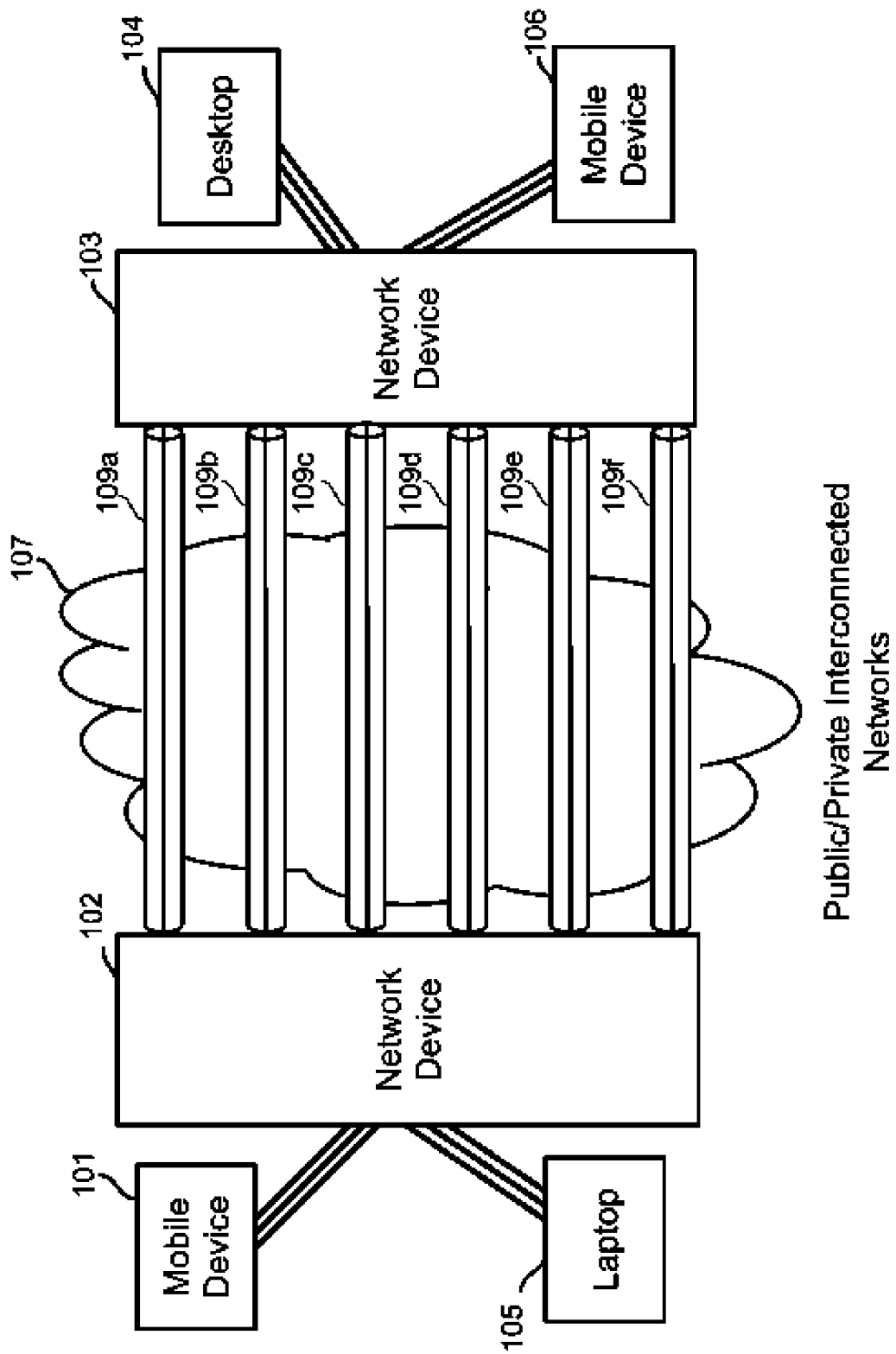
FIG. 1D illustrates a network diagram according to embodiments of the present invention.
Figure 1E:
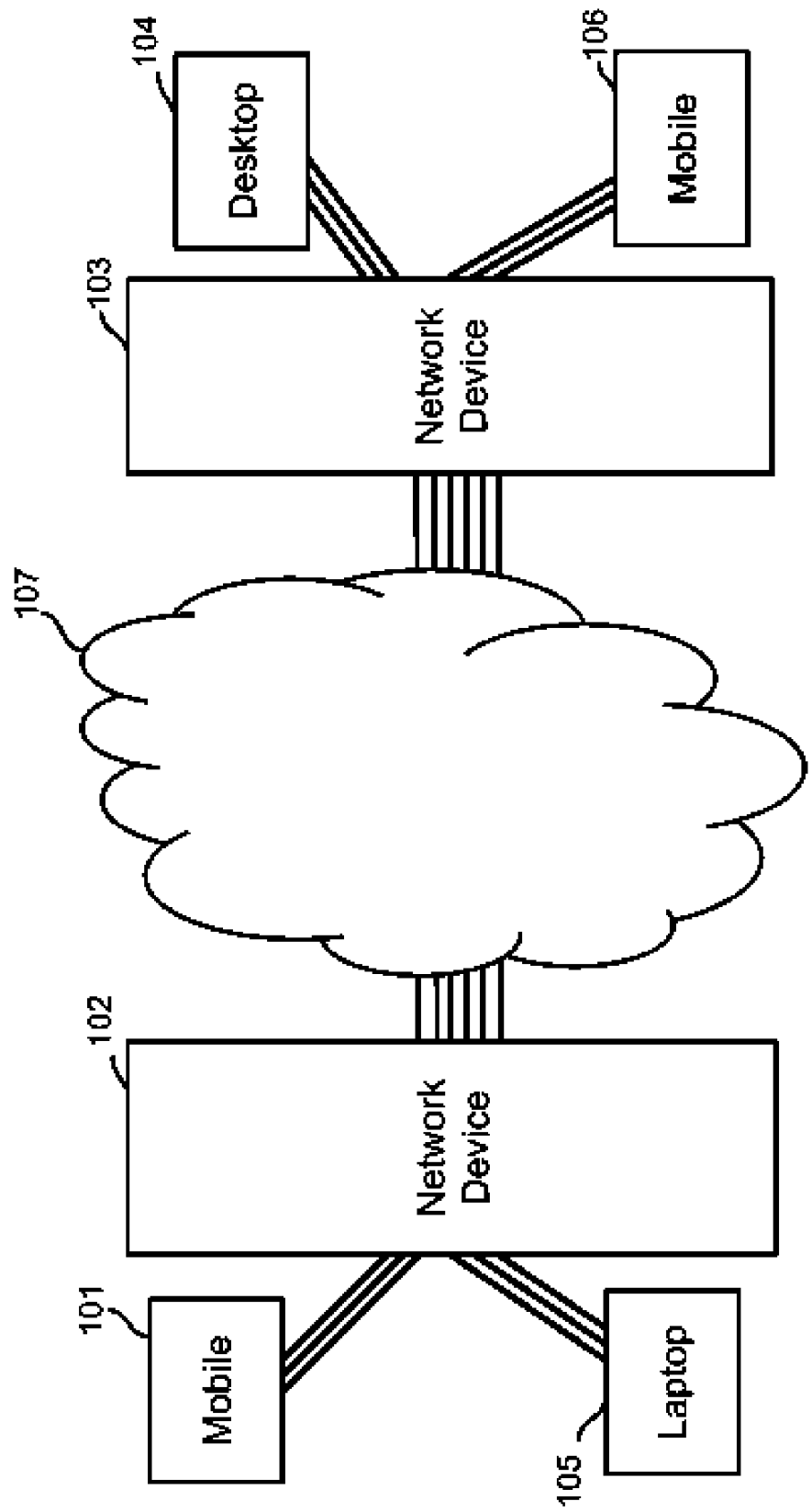
FIG. 1E illustrates a network diagram without a tunnel according to embodiments of the prior art.

FIG. 1D illustrates a typical network deployment of the present invention for the network scenario illustrated in FIG. 1A. In this illustration, network devices 102 and 103 are capable of sending TCP/IP packets according to one of the embodiments of the present invention. Compared to FIG. 1B and FIG. 1C, six tunnels 109a-f are established between network device 102 and network device 103. According to the scenario illustrated in FIG. 1B and FIG. 1C, logical data connection 109a between network devices 102 and 103 is part of the logical data connection established between mobile device 101 and desktop 104. Logical data connections 109b and 109c between network devices 102 and 103 are part of the logical data connections established between mobile device 101 and mobile device 106 respectively. Logical data connections 109d and 109e between network devices 102 and 103 are part of the logical data connections established between laptop 105 and desktop 104 respectively. Logical data connection 109f between network devices 102 and 103 is part of the logical data connection established between mobile device 101 and mobile device 106. There is no limitation on the number of network interfaces of network device 102 and network device 103 used for establishing a logical data connection. The number of network interfaces used may vary according to desired routers and configurations.

In the illustrated embodiment in FIG. 1A, two network interfaces of network device 102 and three network interfaces of network device 103 are used for connecting to public/private interconnected networks 107 through respective access networks 130 and 131. A logical data connection may then be established over one of access networks 130, public/private interconnected networks 107, and one of access networks 131. Access networks 130 and 131 are physical data connections for communicating information within public/private interconnect networks 107 between network device 102 and network device 103. Access networks 130 and 131 may have similar or different bandwidth capabilities.

In one example, when network device 102 detects a new logical data connection is required between one of devices in one of its LAN to another device with an IP address reachable through network device 103, network device 102 will establish a tunnel with network device 103 to carry this new logical data connection. For example, a logical data connection is a web page HTTP request made by mobile device 101 to mobile device 106. A tunnel is then established between network device 102 and network device 103.

In one example, the tunnel established between network device 102 and network device 103 may be established through at least one wireless access network. For illustrative purposes, access network 130a may be a LTE. Access network 130b may be an optical fiber. Access network 131a may be a Wi-Fi. Access network 131b may be an optical fiber.

For example, a tunnel may be established through access networks 130a and 131a. In another example, a tunnel may be established through access networks 130a and 131b. In another example, a tunnel may be established through access networks 130b and 131a. In another example, a tunnel may be established through access networks 130b and 131b.

There is no limitation on the tunnels established must be the above-mentioned combination. The tunnels may be established in other combination with different types of access network.

Vice versa, when network device 103 detects a new logical data connection is required between one of devices in one of its LAN to an IP address reachable through network device 102, network device 103 will establish a tunnel with network device 102 to carry this new logical data connection. Once the tunnel is established, data belonging to the logical data connection may be sent and received through the tunnel. In one variant, the tunnel will be removed when the logical data connection is closed. In another variant, the tunnel will be removed when there is no data being sent or received after a period of time.

Tunnels 109 belong to the same group that they are established using the same encryption protocols and the same initialization vector. For example, tunnels 109 may use the same shared key. However, each tunnel of tunnels 109 has its own source port and destination port. Depending where tunnels 109 are established through the same pair of network interfaces, the source IP address of tunnels 109 may be the same or different and the destination IP address of tunnels 109 may be the same or different.

Figure 8:
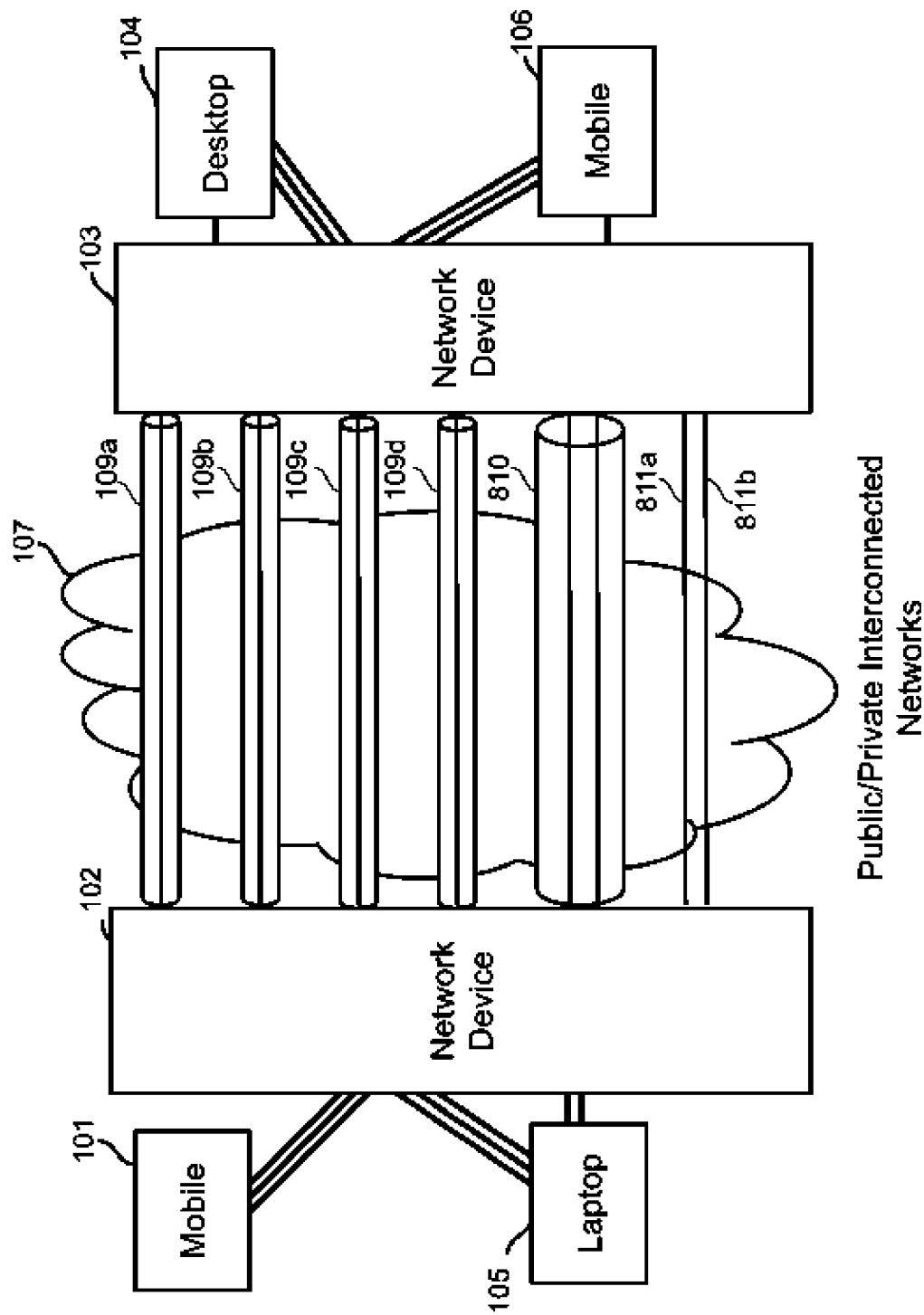
FIG. 8 illustrates a network diagram according to embodiments of the present invention.

FIG. 8 illustrates a network deployment of the present invention. Different from FIG. 1D, in FIG. 8, four tunnels 109a-d, a tunnel 810, and two logical data connections 811a-b are established between one or more WAN interfaces of network device 102 and one or more WAN interfaces of network device 103.

There is no limitation on the number of the connections and on the types of connections. There is also no limitation that all logical data connections must be carried by tunnels. For illustrative purposes, similar with the illustration in FIG. 1D, a first logical data connection between mobile device 101 and desktop 104 is carried by tunnel 109a; a second logical data connection and a third logical connection between mobile device 101 and desktop 104 is carried by tunnels 109b and 109c respectively. A fourth logical data connection between mobile device 101 and desktop 104 is carried by tunnel 109d. Two logical data connections between mobile device 101 and desktop 104 are carried by tunnel 810. Logical data connection 811a is the connection not carried by any tunnel between laptop 105 and desktop 104. Logical data connections 811a and 811b are the connection not carried by any tunnel between laptop 105 and mobile device 106.

There is no limitation on the number of tunnels established. For example, three tunnels may be established when there are three logical data connections between devices in the LAN of network device 103 and devices in the LAN of network device 102. In another example, hundreds of tunnels may be established when there are hundreds of logical data connections between devices in the LAN of network device 103 and devices in the LAN of network device 102.

In one example, tunnel 109a is established over access network 130a and access network 131a. Tunnel 109b is established over access network 130a and access network 131b. Tunnel 109c is established over access network 130a and access network 131c. Tunnel 109d is established over access network 130b and access network 131a. Tunnel 109e is established over access network 130b and access network 131b. Tunnel 109f is established over access network 130b and access network 131b. There is no limitation that tunnels are established in the above-mentioned combination. The tunnels may be established in any combinations thereof.

There is no limitation on the number of tunnels using the same or different access networks 130a-b and the same or different access networks 131a-c. For example, each tunnel of tunnels 109a-d may be established over access network 130a and access network 131a, and each tunnel of tunnels 109e-f may be established over access network 130b and access network 131b. There is also no limitation on how frequently an access network of access network 130 or an access network of access network 131 is used to establish a tunnel. In another example, each tunnel of tunnels 109a-f is established over access network 130a and any of access network of access network 131. There is also no limitation on the number of access network 130 or access network 131 may be used to establish a tunnel. For example, access networks 131b and 131c are not used to establish any tunnel. The tunnels may be only established over access network 131a and any of access network of access network 130.

In one embodiment, a tunnel may be an aggregated tunnel. A plurality of tunnels may be aggregated, combined or bonded together to form one aggregated tunnel. Those skilled in the arts would appreciate that there are myriad ways to aggregate, combine, or bond a plurality of established end-to-end connections to form one aggregated end-to-end connection. An aggregated end-to-end connection is perceived as one end-to-end connection by sessions or applications that are using it. An aggregated end-to-end connection may be perceived as a tunnel, a virtual private network or connection, or a connectionless oriented connection. For example, an aggregated end-to-end connection is a TCP connection. In another example, an aggregated end-to-end connection is a UDP connection. In another example, an aggregated end-to-end connection is an aggregation of a plurality of tunnels, and each tunnel is linked between a first node and a second node. In another example, an aggregated end-to-end connection is a VPN tunnel, comprising a plurality of established end-to-end connections, and each established end-to-end connection is linked between a first node and a second node.

Although there is no limitation on which access networks 130 and 131 are selected when a tunnel is established over the access networks 130 and 131, it is preferable that the access networks are selected to optimize the performance of the network traffic flow during packet sending. In one embodiment, the access networks are selected based on policy. The policy may be based on one or more of the following conditions: performance, roundtrip time, priority, high availability, distance, bandwidth rates, bitrate, cost and medium. For example, if the access networks are selected based on the cost, an access network with lower cost is selected when establishing a tunnel. However, if the selection is only based on the cost, all the logical data connections may select the same access network, such as access network 130a, and resulting in lowering the performance.

In another example, if the access networks are selected based on the cost and the performance. The logical data connection may establish over the access network with lower cost while considering the performance of the overall performance of the network. If the access network, which has a lower cost, is selected by another logical data connection, the cost of that logical data connection becomes higher. It is not preferable for a logical data connection to be established over that access network.

The packets of the same session may be selected to send through a logical data connection with or without a tunnel according to one or more of the following conditions: the source address of the packets, the destination address of the packets, protocol and the application.

In one embodiment, a logical data connection with a tunnel is selected if the session is the HTTP session. In another embodiment, a logical data connection with a tunnel is selected if the source address is a specified source address and destination. For example, a logical data connection with a tunnel is selected if the IP packets are sent from laptop 105 to mobile device 106.

Figure 1F:
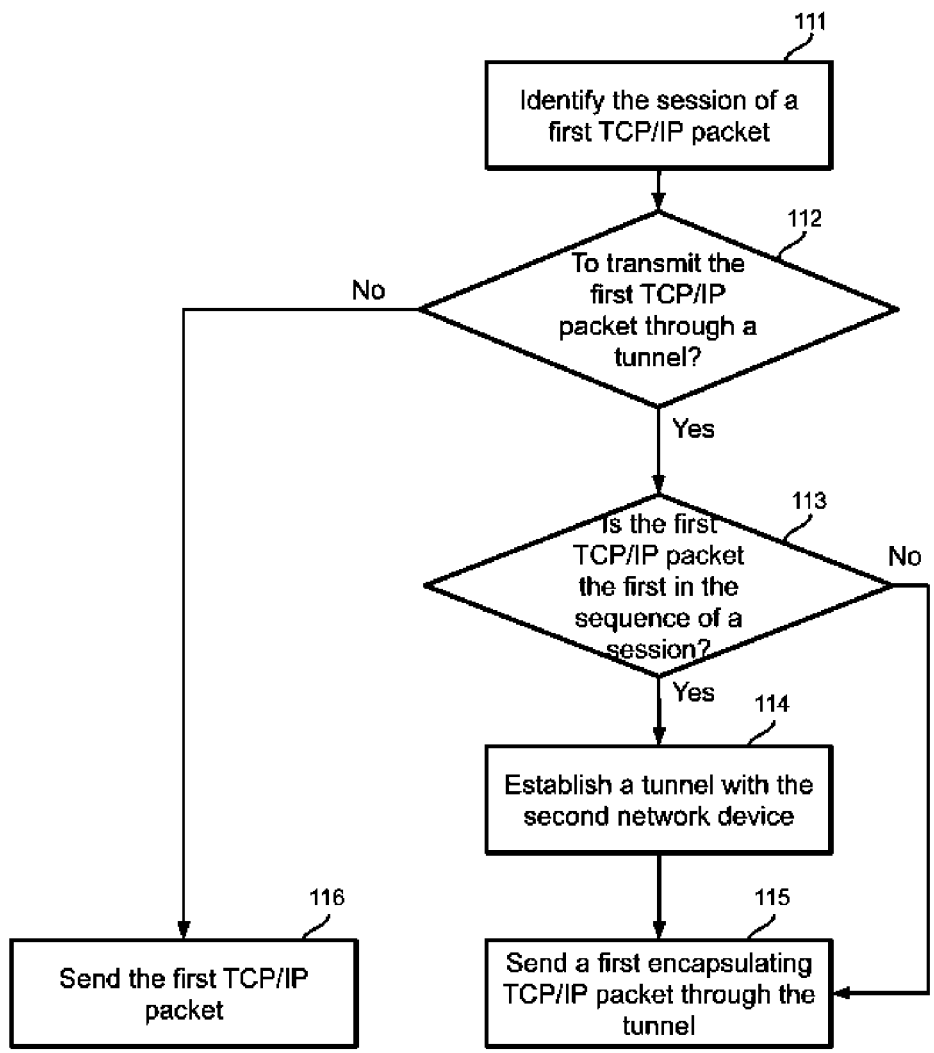
FIG. 1F is the flowchart illustrating the processes performing in a network device when sending a TCP/IP packet in a session according to embodiments of the present invention.

FIG. 1F is a flowchart illustrating the processes performing in a network device, such as network device 102 or 103, when sending a TCP/IP packet from that network device to another network device. For illustrative purposes, network device 102 receives a TCP/IP packet from laptop 105 designated to an IP address reachable through network device 103. The IP address, for example, belongs to desktop 104. For readability, the TCP/IP packet, which originated from laptop 105 and received by one of LAN network interfaces of network device 102, is referred to as a first TCP/IP packet in FIG. 1F. At process 111, network device 102 identifies the session of the first TCP/IP packet according to source address, destination address, source port number, and destination port number of the first TCP/IP packet.

At process 112, network device 102 decides whether to send the first TCP/IP packet through or not through a tunnel. The decision may be based on a myriad of factors, including outbound policy for laptop 105, security policy of network device 102, outbound policy for desktop 104 and security policy for network device 103. If the first TCP/IP packet does not need to be sent through a tunnel, process 116 is then performed to send the first TCP/IP packet without using a tunnel. If the first TCP/IP packet needs to be sent through a tunnel, process 113 is then performed before sending the first TCP/IP packet through the tunnel.

At process 113, if the first TCP/IP packet is not the first in the sequence of a session, process 115 will be performed. If the first TCP/IP packet is the first in the sequence of a session, network device 102 will establish a tunnel with network device 103 at process 114. There is no limitation to how the tunnel is established. For example, the tunnel may be established using IPSec or Generic Routing Encapsulation (GRE). It is preferred to use a tunnel protocol based on TCP with consistent source port number and destination port number in order to have session consistency. For example, when the first TCP/IP packet left laptop 105, it may have a source address, namely Laptop-SA; destination address, namely Laptop-DA; source port number, namely Laptop-SP; and destination port number, namely Laptop-DP. When network device 102 sends the first TCP/IP packet through a tunnel, the first TCP/IP packet may be encapsulated by a first encapsulating packet. The source address of the first encapsulating packet, namely Device-SA, will be the IP address of the network interface of network device 102 sending the encapsulating packet; the destination address of the first encapsulating packet, namely Device-DA, will be the IP address of the network interface of network device 103 receiving the encapsulating packet; the source port number of the first encapsulating packet, namely Device-SP, will be a port assigned by the processing unit of network device 103 receiving the encapsulating packet, and the destination port number of the first encapsulating packet, namely Device-DP, will be a port of network device 103 receiving the encapsulating packet.

As for packets belonging to the same session of the first TCP/IP packet will have the same Laptop-SA, Laptop-DA, Laptop-SP and Laptop-DP. The encapsulating packets, which encapsulate packets of this session, should have the same Device-SA, Device-DA, Device-SP and Device-DP in order to allow session consistency. The ability to maintain session consistency may reduce packet drops, lower latency variance and larger bandwidth allotment when the encapsulating packets travel through public/private interconnected networks 107.

It is also preferred to have the tunnel being encrypted in order to have better security.

At process 115, the first TCP/IP packet is encapsulated and being sent through the tunnel.

Example 1—Packets are Sent from Mobile Device 101 to Desktop 104

In Example 1, FIG. 2A and FIG. 2B are illustrated in network device 102 and network device 103 respectively according to the embodiments of the present invention.

FIG. 2A is a flowchart illustrating the processes performing in network device 102 when sending a TCP/IP packet through a tunnel according to one of the embodiments of the present invention. FIG. 2A should be viewed in conjunction with FIG. 1A, FIG. 1D, FIG. 1F, FIG. 5, and FIG. 7. For illustrative purposes, in this example, mobile device 101 is the source device and desktop 104 is the destination device. Therefore, packets are sent from mobile device 101 to desktop 104. Processes 201 to 204 are detailed illustrations of process 115. It will be shown that the processing unit of network device 102 will encapsulate the packets received from mobile device 101 and send the encapsulated packets to network device 103, and the processing unit of network device 103 will then decapsulate the encapsulated packets received from network device 102 and send the packets to desktop 104.

In process 201, the processing unit of network device 102 receives a first TCP/IP packet from mobile device 101. In view of FIG. 5, the first TCP/IP packet is TCP/IP packet 501. The structure of TCP/IP packet 501 follows packet structure 711, which holds header section 701 and payload section 702. The source address and the destination address of TCP/IP packet 501 are the IP address of mobile device 101 and the IP address of desktop 104 respectively.

In one example, if mobile device 101 is behind a Network Address Translation (NAT) device or a network device with NAT function, the source address of TCP/IP packet 501, which is the IP address of mobile device 101 is mapped and translated to another IP address according to a NAT table before forwarding TCP/IP packet 501 to network device 103 and further to desktop 104.

In another example, the source address and the source port of TCP/IP packet 501 are mapped and translated to another IP address and a unique port of network device 102 by the processing unit of network device 102 before forwarding TCP/IP packet 501 to network device 103 and further to desktop 104.

In process 202, the processing unit of network device 102 creates tunnel information. Tunnel information may comprise the data for encapsulation purposes, such as encryption information, management information, network performance information, and authentication information. The tunnel information is the information to allow the sending of TCP/IP packet 501 through a tunnel established between network device 102 and network device 103. The tunnel is established in process 114 of FIG. 1F before process 201 is performed.

Figure 5:
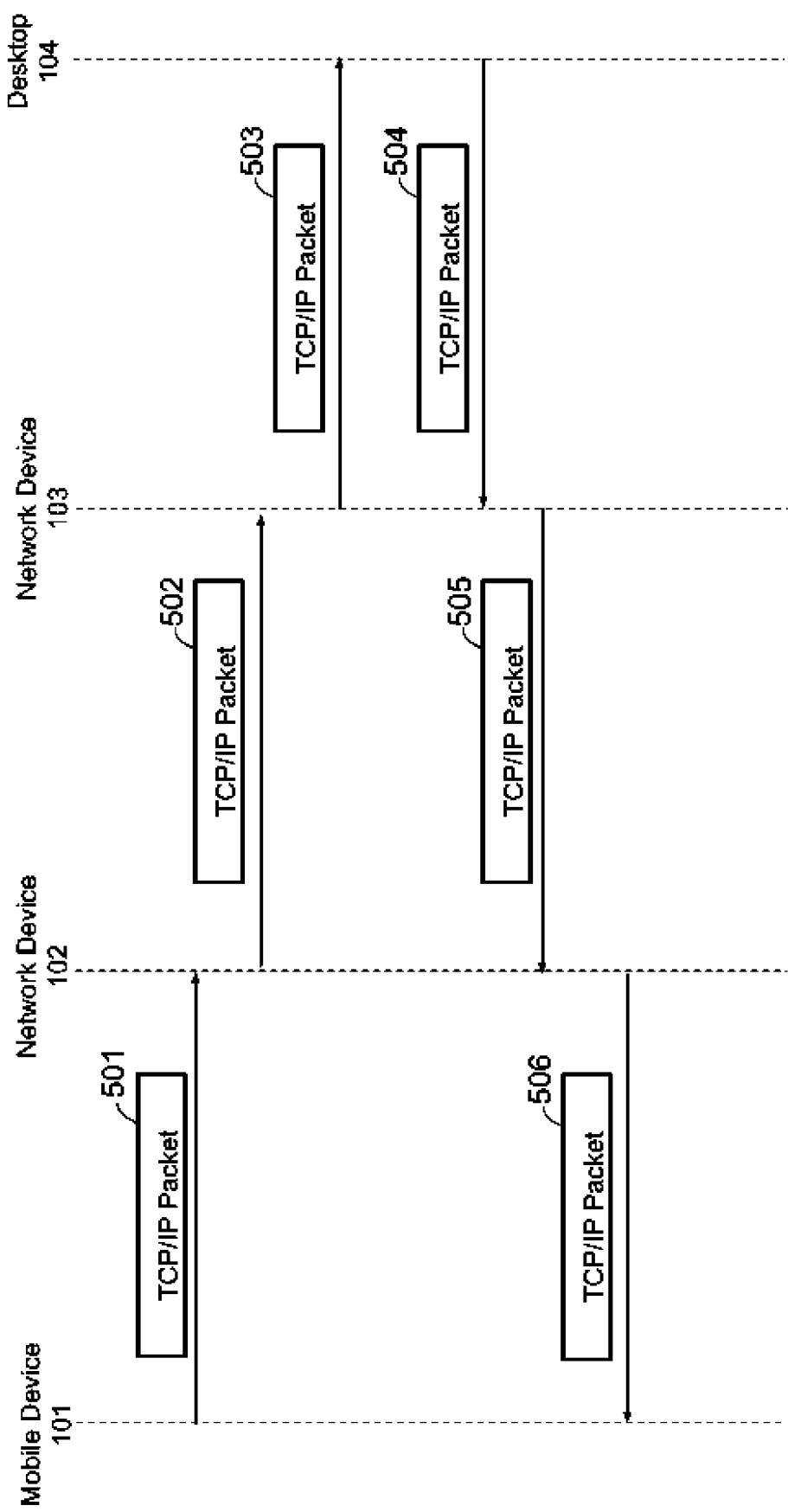
FIG. 5 is a timing diagram illustrating the timing of data packets sent and received between the source device and the destination device in accordance with an embodiment of the present invention.

In process 203, the processing unit of network device 102 creates a first encapsulating TCP/IP packet, which is TCP/IP packet 502 in FIG. 5. TCP/IP packet 502 comprises a header and a payload. The structure of TCP/IP packet 502 follows packet structure 712. The four sections in packet structure 712 are header section 704, tunnel information section 703, encapsulated header section 701 and encapsulated payload section 702. Tunnel information section 703, encapsulated header section 701 and encapsulated payload section 702 together are the payload section. Header of TCP/IP packet 502 comprises header section 704, which may hold a source address, which is the IP address of the network interface of network device 102; a destination address, which is the IP address of a network interface of network device 103; source port number, which is the port number of network device 102; destination port number, which is the port number of network device 103; checksum and segment number. Payload section of TCP/IP packet 502 holds the tunnel information created at process 202, and the TCP/IP packet received at process 201. Therefore, TCP/IP packet 501 is encapsulated in the payload section of TCP/IP packet 502.

In process 204, network device 102 sends TCP/IP packet 502 to network device 103 through the tunnel via the network interface.

FIG. 2B is the flowchart illustrating the processes performing in network device 103 when receiving a TCP/IP packet through a network interface. FIG. 2B should be viewed in conjunction with FIG. 1A, FIG. 1D, FIG. 5, and FIG. 7.

Network device 103 receives a TCP/IP packet from network device 102 in process 211. For illustrative purposes, the received TCP/IP packet is TCP/IP packet 502 in FIG. 5.

In process 212, the processing unit of network device 103 decides whether TCP/IP packet 502 belongs to a session. The decision may be achieved by detecting the structure of TCP/IP packet 502.

If the payload of TCP/IP packet 502 does not comprise tunnel information, TCP/IP packet 502 probably does not belong to a session, and process 215 is performed subsequently. For example, the structure of TCP/IP packet 502 should follow packet structure 711. In process 215, network device 103 sends the received TCP/IP packet to desktop 104 if the received TCP/IP packet does not belong to the session. For illustrative purposes, the received TCP/IP packet sent to desktop 104 is TCP/IP packet 503. As a result, the payload of TCP/IP packet 503 should be identical to the payload of TCP/IP packet 501. If the payload of TCP/IP packet 502 comprises tunnel information, TCP/IP packet 502 belongs to a session, and process 213 is then performed.

In process 213, tunnel information, and a TCP/IP, such as TCP/IP packet 503, packet is retrieved from the payload of TCP/IP packet 502. Therefore, TCP/IP packet 503 should be identical to TCP/IP packet 501.

In process 214, the processing unit of network device 103 sends TCP/IP packet 503 to a destination device according to the destination address in the header section of TCP/IP packet 503. For example, network device 103 sends TCP/IP packet 503 to desktop 104 and the destination address of TCP/IP packet 503 is the IP address of desktop 104.

Example 2—Packets are Sent from Mobile Device 106 to Laptop 105

The embodiments of the invention may generally be directed to bidirectional data transmission over a communication channel. Hence, the processes flowchart illustrated in FIG. 2A and FIG. 2B may also be performed in any network device. For illustrative purposes, in this example, mobile device 106 is the source device and laptop 105 is the destination device. Therefore, packets are sent from mobile device 106 to laptop 105. Comparing this example against Example 1 which packets are sent from mobile device 101 to desktop 104, in this example the processing unit of network device 103 will perform encapsulation while the processing unit of network device 102 will perform decapsulation.

The processes flowchart illustrated in FIG. 2A may also be performed in network device 102 when receiving a TCP/IP packet through a network interface. FIG. 2A should be viewed in conjunction with FIG. 1A, FIG. 1D, FIG. 5, and FIG. 7.

In process 201, the processing unit of network device 103 receives a first TCP/IP packet from mobile device 106. In view of FIG. 5, the first TCP/IP packet is TCP/IP packet 504. The structure of TCP/IP packet 504 follows packet structure 711, which holds header section 701 and payload section 702. The source address and destination address of TCP/IP packet 504 are the IP address of mobile device 106 and the IP address of laptop 105 respectively.

In one example, if mobile device 106 is behind a NAT device or a network device with NAT function, the IP address of mobile device 106 is mapped and translated to another IP address according to a NAT table before forwarding TCP/IP packet 504 to network device 102 and further to laptop 105.

In another example, the source address and the source port are mapped and translated to another IP address and a unique port of network device 103 by the processing unit of network device 103 before forwarding TCP/IP packet 504 to network device 102 and further to laptop 105.

In process 202, the processing unit of network device 103 creates tunnel information.

In process 203, the processing unit of network device 103 creates a first encapsulating TCP/IP packet, which is TCP/IP packet 505 in FIG. 5. The structure of TCP/IP packet 505 follows packet structure 712. Header section of TCP/IP packet 505 comprises header section 704, which may hold a source address, which is the IP address of the network interface of network device 103; a destination address, which is the IP address of a network interface of network device 102; source port number, which is the port number of network device 103; destination port number, which is the port number of network device 102; checksum; and segment number. Payload section of TCP/IP packet 505 holds the tunnel information created at process 202, and the TCP/IP packet received at process 201. Therefore, TCP/IP packet 504 is encapsulated in the payload section of TCP/IP packet 505.

In process 204, network device 103 sends TCP/IP packet 505 to network device 102 through the network interface.

The processes flowchart illustrated in FIG. 2B may also be performed in network device 102 when receiving a TCP/IP packet through a network interface. FIG. 2B should be viewed in conjunction with FIG. 1D, FIG. 5, and FIG. 7.

Network device 102 receives a TCP/IP packet from network device 103 in process 211. For illustrative purposes, the received TCP/IP packet is TCP/IP packet 505 in FIG. 5.

In process 212, the processing unit of network device 102 decides whether TCP/IP packet 505 belongs to a session.

If the payload of TCP/IP packet 505 does not comprise tunnel information, TCP/IP packet 505 probably does not belong to a session, and process 215 is performed subsequently. For example, the structure of TCP/IP packet 505 should follow packet structure 711. In process 215, network device 102 sends the received TCP/IP packet to laptop 105 if the received TCP/IP packet does not belong to the session. For illustrative purposes, the received TCP/IP packet sent to laptop 105 is TCP/IP packet 506. As a result, TCP/IP packet 506 should be identical to TCP/IP packet 504. If the payload of TCP/IP packet 505 comprises tunnel information, TCP/IP packet 505 belongs to a session, and process 213 is then performed.

In process 213, tunnel information and TCP/IP packet 506 are retrieved from the payload of TCP/IP packet 505. The retrieved TCP/IP packet is TCP/IP packet 504, which was encapsulated in TCP/IP packet 505. Therefore, TCP/IP packet 506 should be identical to TCP/IP packet 504.

In process 214, TCP/IP packet 506 is then sent to the destination device according to the destination address in the header section of TCP/IP packet 506. In the present illustration, the destination address of TCP/IP packet 506 is the IP address of laptop 105.

Example 3—Packets are Sent from Mobile Device 101 to Desktop 104

FIG. 3A is a flowchart illustrating the processes performing in network device 102 when sending a first TCP/IP packet through a tunnel according to the embodiments of the present invention. FIG. 3A should be viewed in conjunction with FIG. 1A, FIG. 1D, FIG. 1F, FIG. 6, and FIG. 7. For illustrative purposes, mobile device 101 is the source device and desktop 104 is the destination device. Comparing this example against Example 1, network device 102 not only sends a first encapsulating TCP/IP packet, but also a TCP/IP packet before, after or about at the same time the first encapsulating TCP/IP packet is being sent. Network device 103 will then determine the received packet is the first TCP/IP packet or the first encapsulating TCP/IP packet. The time difference of sending the first encapsulating packet and sending the first packet should be as small as 2 ms.

When the first TCP/IP packet is received from mobile device 101, processes 301-304 are performed by the processing unit of network device 102. Processes 301-304 are identical to the processes 201-204 in Example 1. In view of FIG. 6, the first TCP/IP packet is TCP/IP packet 601.

In process 301, the processing unit of network device 102 receives TCP/IP packet 601 from mobile device 101. The structure of TCP/IP packet 601 follows packet structure 711, which holds header section 701 and payload section 702. The source address and destination address of TCP/IP packet 601 are the IP address of mobile device 101 and the IP address of desktop 104 respectively.

In one example, if mobile device 101 is behind a NAT device or a network device with NAT function, the source address of TCP/IP packet 601, which is the IP address of mobile device 101, is mapped and translated to another IP address according to a NAT table before forwarding TCP/IP packet 601 to network device 103 and further to desktop 104.

In another example, the source address and the source port of TCP/IP packet 601 are mapped and translated to another IP address and a unique port of network device 102 before forwarding TCP/IP packet 601 to network device 103 and further to desktop 104.

In process 302, the processing unit of network device 102 creates tunnel information. In this illustration, the new source address is the IP address of network device 102.

Figure 6:
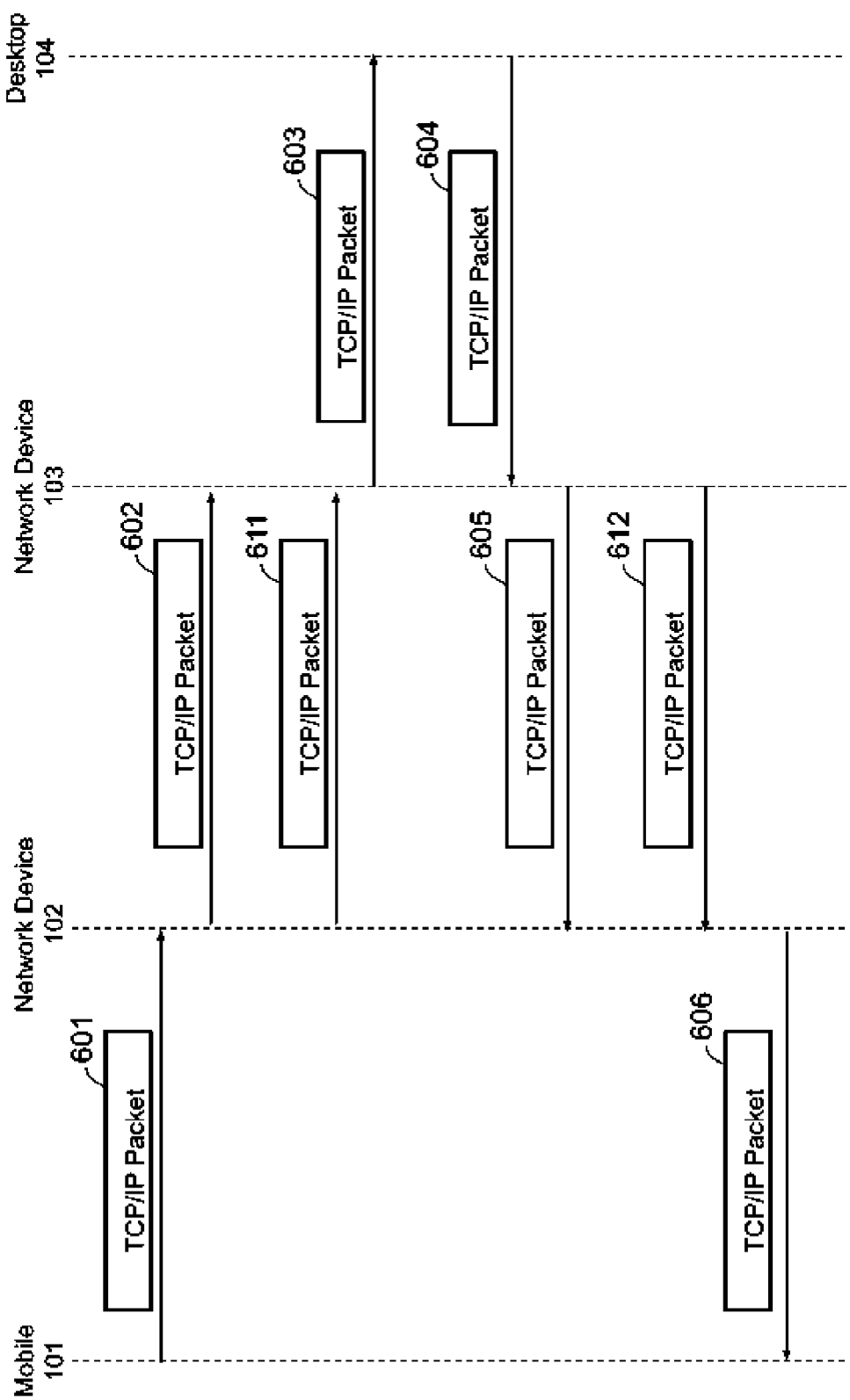
FIG. 6 is a timing diagram further illustrating the timing of data packets sent and received between the source device and the destination device in accordance with another embodiment of the present invention.
Figure 7:
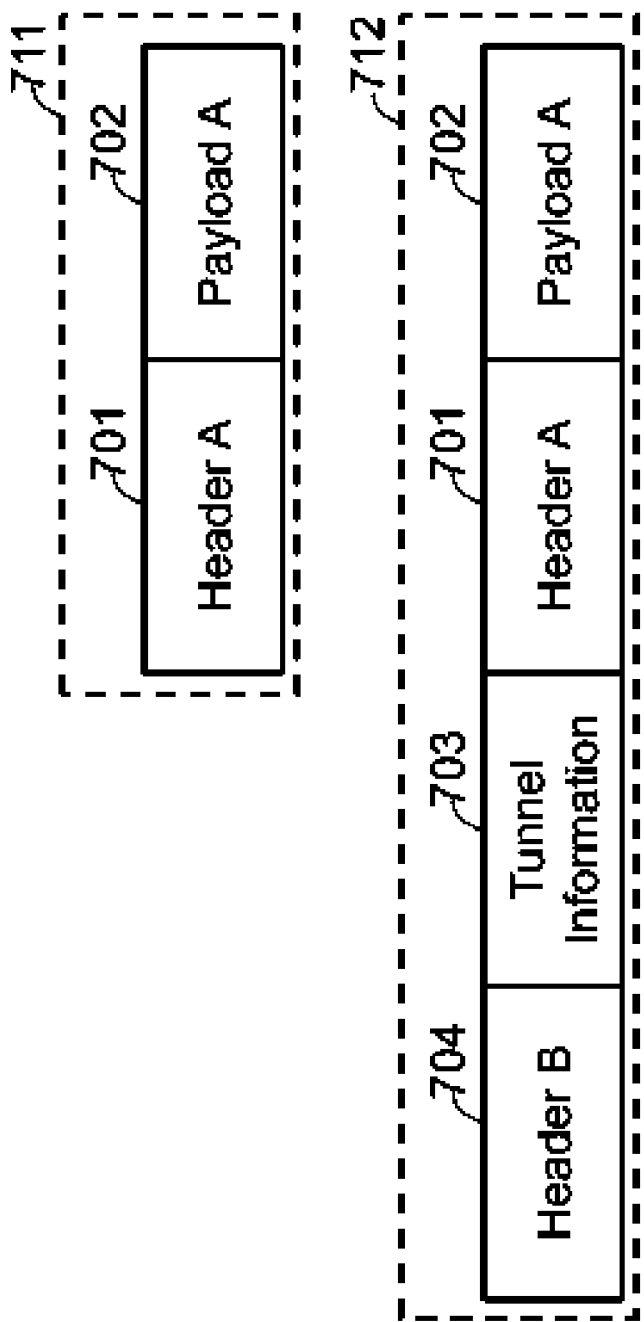
FIG. 7 illustrates the structure of TCP/IP packets according to embodiments of the present invention.

In process 303, the processing unit of network device 102 creates a first encapsulating TCP/IP packet, which is TCP/IP packet 602 in view of FIG. 6. TCP/IP packet 602 comprises a header and a payload. The structure of TCP/IP packet 602 follows packet structure 712. The four sections in packet structure 712 are the same as the packet structure of TCP/IP packet 602 described in process 203. Header of TCP/IP packet 602 holds a source address, a destination address, source port number, destination port number, checksum and segment number. Payload section of TCP/IP packet 602 holds the tunnel information created at process 302, and the TCP/IP packet received at process 301. Therefore, TCP/IP packet 601 is encapsulated in the payload section of TCP/IP packet 602.

In process 304, network device 102 sends TCP/IP packet 602 to network device 103 through the network interface.

In process 305, the processing unit of network device 102 decides if a first condition is met. If the first condition is met, then network device 102 further forwards TCP/IP packet 611 to network device 103 through a network interface. The first condition may be one or more conditions of the following conditions: the type of packet, the session of the IP packet belongs to, the type of the application, the preference from a user or an administrator or other conditions to ensure there are no packet loss.

In one example, packets belonging to a session are for video conferencing. In order to make sure the streaming becomes smooth, the first condition is satisfied to avoid missing packets in the session when sending between network devices through a logical data connection.

In another example, the user or the administrator may prefer the first condition to be satisfied all the time. Hence, the first packet is sent all the time.

The structure of TCP/IP packet 611 follows packet structure 711, which holds header section 701 and payload section 702. In one scenario, when there is no NAT, the contents of TCP/IP packet 611 are the same as the contents of TCP/IP packet 601. The header and payload of TCP/IP packet 611 are the header and payload of TCP/IP packet 601 respectively. In this scenario, therefore, the source address of TCP/IP packet 611 is the IP address of mobile device 101.

In another scenario, when there is NAT, the header of TCP/IP packet 611 may hold different source IP address and different port number from the source IP address and the port number of TCP/IP packet 601. The payload of TCP/IP packet 611 is the same as the payload of TCP/IP packet 601. In this scenario, therefore, the source address of TCP/IP packet 611 is the IP address of network device 102.

FIG. 3B is the flowchart illustrating the processes performing in network device 103 when receiving a TCP/IP packet through a network interface. FIG. 3B should be viewed in conjunction with FIG. 1A, 1D, FIG. 6, and FIG. 7.

In process 311, network device 103 receives a TCP/IP packet from network device 102. For illustrative purposes, the received TCP/IP packet may be TCP/IP packet 602 or TCP/IP packet 611 shown in FIG. 6.

In process 314, the processing unit of network device 103 decides whether the received TCP/IP packet is received through a tunnel.

If the received TCP/IP packet is received through a tunnel, process 312 is performed subsequently.

If the received TCP/IP packet is not received through a tunnel, process 316 is performed subsequently to retrieve a TCP/IP packet from the received TCP/IP packet. The retrieved TCP/IP packet is identical to the TCP/IP packet 601. After TCP/IP packet 601 is retrieved, process 315 is processed by the processing unit of network device 103 shown in FIG. 3B. Details of processes 312 and 315 will be discussed later.

In process 312, the processing unit of network device 103 decides whether the received TCP/IP packet belongs to a session. The decision may be achieved by detecting the structure of the received TCP/IP packet. If the payload of the received TCP/IP packet comprises tunnel information, the received TCP/IP packet belongs to a session, and process 313 is performed subsequently. If the received TCP/IP packet does not belong to a session, the received TCP/IP packet is sent out directly without decapsulation in process 317.

In process 313, tunnel information and TCP/IP packet 603 are retrieved from the payload of TCP/IP packet 602. The retrieved TCP/IP packet is TCP/IP packet 601, which was encapsulated in TCP/IP packet 602. Therefore, TCP/IP packet 603 should be identical to TCP/IP packet 601.

Process 315 is performed after process 313 or process 316 has been processed by the processing unit of network device 103. In process 315, the processing unit of network device 103 decides if the retrieved TCP/IP packet has been received. The decision may be based on the header of the TCP/IP packet.

If the retrieved TCP/IP packet has been received, the processing unit of network device 103 does not send the retrieved TCP/IP packet to the destination device in process 318.

If the retrieved first TCP/IP packet is not received before, the processing unit of network device 103 sends the retrieved TCP/IP packet to the destination device in process 319.

Example 4—Packets are Sent from Mobile Device 106 to Laptop 105

The embodiments of the invention may generally be directed to bidirectional data transmission over a communication channel. Hence, the processes flowchart illustrated in FIG. 3A may also be performed in any network device. For illustrative purposes, mobile device 106 is the source device and laptop 105 is the destination device. Comparing this example against Example 3, network device 103 not only sends the encapsulating TCP/IP packet, but also sends a first TCP/IP packet to network device 102 before, after or about the same time the first encapsulating TCP/IP packet is being sent. Network device 102 determines the received packet is the first TCP/IP packet or the first encapsulating TCP/IP packet.

In process 301, the processing unit of network device 103 receives the first TCP/IP packet, which is TCP/IP packet 604 in FIG. 6, from mobile device 106. The structure of TCP/IP packet 604 follows packet structure 711, which holds header section 701 and payload section 702. The source address and destination address of TCP/IP packet 604 are the IP address of mobile device 106 and the IP address of laptop 105 respectively.

In process 302, the processing unit of network device 103 creates tunnel information. In this illustration, the new source address is the IP address of network device 103.

In process 303, the processing unit of network device 103 creates a first encapsulating TCP/IP packet, which is TCP/IP packet 605 in FIG. 6. The structure of TCP/IP packet 605 follows packet structure 712. Header section of TCP/IP packet 605 holds a source address, a destination address, source port number, destination port number, checksum and segment number. Payload section of TCP/IP packet 605 holds the tunnel information created at process 302, and the TCP/IP packet received at process 301. Therefore, TCP/IP packet 604 is encapsulated in the payload section of TCP/IP packet 605.

In process 304, network device 103 sends TCP/IP packet 605 to network device 102 through the network interface.

In process 305, the processing unit of network device 103 decides if a first condition is met. If the first condition is met, then network device 103 further forwards TCP/IP packet 612 to network device 102 through a network interface. In one scenario, when there is no NAT, the contents of TCP/IP packet 612 are the same as the contents of TCP/IP packet 604. The header and payload of TCP/IP packet 612 are the header and payload of TCP/IP packet 604 respectively. In this scenario, therefore, the source address of TCP/IP packet 612 is the IP address of mobile device 106.

In another scenario, when there is NAT, the header of packet 612 may hold different source IP address and different port number from the source IP address and the port number of TCP/IP packet 604. The payload of TCP/IP packet 612 is the same as the payload of TCP/IP packet 604. In this scenario, therefore, the source address of TCP/IP packet 612 is the IP address of network device 103.

FIG. 3B is the flowchart illustrating the processes performing in network device 102 when receiving a TCP/IP packet through a network interface. FIG. 3B should be viewed in conjunction with FIGS. 1A, 1D, FIG. 6, and FIG. 7.

Network device 102 receives a TCP/IP packet from network device 103 in process 311.

In process 314, the processing unit of network device 102 decides whether the received TCP/IP packet is received through a tunnel.

If the received TCP/IP packet is received through a tunnel, process 312 is performed subsequently. For illustrative purposes, the received TCP/IP packet may be TCP/IP packet 605 or TCP/IP packet 612 shown in FIG. 6.

If the received TCP/IP packet is not received through a tunnel, process 316 is performed subsequently to retrieve a TCP/IP packet from the received TCP/IP packet. The retrieved TCP/IP packet is identical to the TCP/IP packet 604. After TCP/IP packet 604 is retrieved, process 315 is processed by the processing unit of network device 102 shown in FIG. 3B.

In process 312, the processing unit of network device 102 decides whether the received TCP/IP packet belongs to a session. The decision may be achieved by detecting the structure of TCP/IP packet 605. If the payload of the received TCP/IP packet comprises tunnel information, the received TCP/IP packet belongs to a session, and process 313 is performed subsequently. If the received TCP/IP packet does not belong to a session, the received TCP/IP packet is sent out directly without decapsulation in process 317.

In process 313, tunnel information and TCP/IP packet 606 are retrieved from the payload of TCP/IP packet 605. The retrieved TCP/IP packet is TCP/IP packet 604, which was encapsulated in TCP/IP packet 605. Therefore, TCP/IP packet 606 should be identical to TCP/IP packet 604.

Process 315 is performed after process 313 or process 316 have been processed by the processing unit of network device 102. In process 315, the processing unit of network device 102 decides if the retrieved first TCP/IP packet has been received. The decision may be based on the header of the TCP/IP packet.

If the retrieved TCP/IP packet has been received, the processing unit of network device 102 does not send the retrieved TCP/IP packet to the destination device in process 318.

If the retrieved first TCP/IP packet is not received before, the processing unit of network device 102 sends the retrieved TCP/IP packet to the destination device in process 319.

There is no limitation that the processes of process flowcharts FIG. 2A, FIG. 2B, FIG. 3A, and FIG. 3B must be performed only at network device 102 or must be performed only at network device 103. As a network device may send and receive TCP/IP packets at the same time, network devices 102 and 103 may both perform the processes of process flowcharts FIG. 2A, FIG. 2B, FIG. 3A, and FIG. 3B.

The invention claimed is:

1. A method of sending and receiving Internet Protocol (IP) packets between a first network node and a second network node, comprising: at the first network node:
   a. receiving a first IP packet at a local area network (LAN) interface of the first network node;
   b. identifying a source address, a destination address, a source port number, and a destination port number of the first IP packet;
   c. when the destination address of the first IP packet is reachable through the second network node and the first IP packet is a first of IP packets in a sequence of a session;
      i. establishing a corresponding tunnel of the session with the second network node;

ii. encapsulating the first packet into an encapsulating IP packet;
iii. sending the encapsulating IP packet through the corresponding tunnel to the second network node; and
iv. sending a second IP packet to the second network node;
d. when the session ends, removing the corresponding tunnel; wherein the second IP packet is identical to the first IP packet.

2. The method of claim 1, wherein the encapsulating IP packet comprises a virtual private network (VPN) information and the VPN information comprises a security information.

3. The method of claim 1, wherein step (c)(iv) is performed when a condition is met.

4. The method of claim 3, wherein the condition is based on one or more of following: a type of an IP packet, a session of an IP packet belongs to, and a preference from a user or an administrator.

5. The method of claim 1, further comprising:
at the second network node:
f. when an IP packet is received through a tunnel:
i. retrieving a VPN information and a retrieved packet from the IP packet; and
ii. sending the retrieved packet to the destination address;
g. when the IP packet is received not through the tunnel, sending the IP packet to the destination address.

6. The method of claim 1, further comprising:
at the first network node:
before performing step (b), determining whether the first IP packet is to be sent through a tunnel.

7. The method of claim 1, wherein the corresponding tunnel is removed when no IP packet is sent after a time period.

8. The method of claim 1, further comprising:
at the first network node:
before performing step (c)(iii):
h. generating tunnel information; and
i. encapsulating the tunnel information into the encapsulating IP packet.

9. The method of claim 1, wherein the corresponding tunnel is removed when no IP packet is received after a time period.

10. A method of sending and receiving Internet Protocol (IP) packets between a first network node and a second network node, comprising: at the first network node:
a. when an IP packet is a first packet in a sequence of a session, establishing a tunnel with the second network node;
b. sending to and receiving from, IP packets of the session, the second network node through the tunnel; and
c. when the session ends, removing the tunnel; wherein: the tunnel is established using one of a plurality of wide area networks connecting to the first network node and a wide area network connecting to the second network node; and the one of the plurality of wide area networks is provided using a cellular network.

11. The method of claim 10, wherein the tunnel is removed when no IP packet is sent or received after a time period.

12. A system, comprising:
a first network node; and
a second network node;
wherein the first network node comprises:
at least one first network interface;
at least one first processing unit;
at least one first main memory coupled to the at least one first processing unit; and
at least one first non-transitory computer readable storage medium coupled to the at least one first processing unit and storing program instructions configured to cause the at least one first processing unit to perform:
a. receiving a first Internet Protocol (IP) packet at a local area network (LAN) interface of the first network node;
b. identifying a source address, a destination address, a source port number, and a destination port number of the first IP packet;
c. when the destination address of the first IP packet is reachable through the second network node and the first IP packet is a first of IP packets in a sequence of a session:
i. establishing a corresponding tunnel of the session with the second network node;
ii. encapsulating the first packet into an encapsulating IP packet;
iii. sending the encapsulating IP packet through the corresponding tunnel to the second network node; and
iv. sending a second IP packet to the second network node;
d. when the session ends, removing the corresponding tunnel; wherein the second IP packet is identical to the first IP packet.

13. The system of claim 12, wherein the encapsulating IP packet comprises a virtual private network (VPN) information and the VPN information comprises a security information.

14. The system of claim 12, wherein step (c)(iv) is performed when a condition is met.

15. The system of claim 14, wherein the condition is based on one or more of following: a type of packet, a session of an IP packet belongs to, and a preference from a user or an administrator.

16. The system of claim 12, wherein the second network node comprises:
at least one second network interface;
at least one second processing unit;
at least one second main memory coupled to the at least one second processing unit; and
the at least one second non-transitory computer readable storage medium coupled to the at least one second processing unit and storing program instructions configured to cause the at least one second processing unit to perform:
f. when an IP packet is received through a tunnel:
i. retrieving a VPN information and a retrieved packet from the IP packet; and
ii. sending the retrieved packet to the destination address;
g. when the IP packet is received not through the tunnel, sending the IP packet to the destination address.

17. The system of claim 12, wherein the at least one first non-transitory computer readable storage medium further storing program instructions executable by the at least one first processing unit for:
before performing step (b), determining whether the first IP packet is to be sent through a tunnel.

18. The system of claim 12, wherein the corresponding tunnel is removed when no IP packet is sent after a time period.

19. The system of claim 12, wherein the at least one first non-transitory computer readable storage medium further storing program instructions executable by the at least one first processing unit for:
  before performing step (c)(iii);
    b. generating tunnel information; and
      i. encapsulating the tunnel information into the encapsulating IP packet.

20. The system of claim 12, wherein the corresponding tunnel is removed when no IP packet is received after a time period.

* * * * *